(12) United States Patent
Zeniya et al.

(10) Patent No.: US 10,137,529 B2
(45) Date of Patent: Nov. 27, 2018

(54) NUMERICAL CONTROLLER CAPABLE OF MACHINING CONDITION CONTROL BASED ON POSTURE

(71) Applicant: FANUC CORPORATION, Minamitsuru-gun, Yamanashi (JP)

(72) Inventors: Shintarou Zeniya, Yamanashi (JP); Takeshi Mochida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 180 days.

(21) Appl. No.: 15/254,104

(22) Filed: Sep. 1, 2016

(65) Prior Publication Data

US 2017/0066080 A1 Mar. 9, 2017

(30) Foreign Application Priority Data

Sep. 3, 2015 (JP) .................................. 2015-173798

(51) Int. Cl.
| | |
|---|---|
| *B23K 26/08* | (2014.01) |
| *B23K 26/38* | (2014.01) |
| *G05B 19/402* | (2006.01) |
| *G05B 19/29* | (2006.01) |
| *B23K 26/04* | (2014.01) |

(52) U.S. Cl.
CPC .......... *B23K 26/0884* (2013.01); *B23K 26/04* (2013.01); *B23K 26/38* (2013.01); *G05B 19/29* (2013.01); *G05B 19/402* (2013.01); *G05B 2219/36199* (2013.01)

(58) Field of Classification Search
CPC .... B23K 26/0884; B23K 26/04; B23K 26/38; G05B 19/29; G05B 19/402; G05B 2219/36199

USPC .......................................................... 700/166
See application file for complete search history.

(56) References Cited

U.S. PATENT DOCUMENTS

| | | | | |
|---|---|---|---|---|
| 5,061,839 A | * | 10/1991 | Matsuno | ............. B23K 26/046 219/121.75 |
| 2012/0221141 A1 | | 8/2012 | Otsuki et al. | |
| 2013/0245995 A1 | | 9/2013 | Otsuki et al. | |
| 2015/0266122 A1 | * | 9/2015 | Nakagawa | ............... B23H 1/02 700/162 |

FOREIGN PATENT DOCUMENTS

| | | |
|---|---|---|
| JP | 03128182 A | 5/1991 |
| JP | 06-110524 A | 4/1994 |
| JP | 06-142954 A | 5/1994 |

(Continued)

OTHER PUBLICATIONS

Notification of Reasons for Refusal for Japanese Application No. 2015-173798, dated Sep. 19, 2017 with translation, 5 pages.

*Primary Examiner* — Robert E Fennema
*Assistant Examiner* — Jigneshkumar C Patel
(74) *Attorney, Agent, or Firm* — RatnerPrestia

(57) ABSTRACT

A numerical controller controls a laser beam machine in accordance with a program and performs three-dimensional laser beam machining on a workpiece. The numerical controller obtains a ratio between a machining speed at an upper surface of the workpiece and a machining speed at a lower surface of the workpiece on the basis of a posture of a nozzle of the laser beam machine and changes a machining condition specified by the program on the basis of the obtained ratio.

2 Claims, 7 Drawing Sheets

(56) References Cited

FOREIGN PATENT DOCUMENTS

| | | |
|---|---|---|
| JP | 09-150282 A | 6/1997 |
| JP | 2000-351087 A | 12/2000 |
| JP | 2009166075 A | 7/2009 |
| JP | 2010262442 A | 11/2010 |
| JP | 2011067858 A | 4/2011 |
| JP | 2012-177973 | 9/2012 |
| JP | 2013-196327 | 9/2013 |

* cited by examiner

NUMERICAL CONTROLLER CAPABLE OF MACHINING CONDITION CONTROL BASED ON POSTURE

BACKGROUND OF THE INVENTION

1. Field of the Invention

The present invention relates to a numerical controller and, more particularly, to a numerical controller capable of machining condition control based on the posture of a nozzle which a laser beam machine includes.

2. Description of the Related Art

Three-dimensional laser beam machining includes machining along a curved workpiece surface and machining (bevel cutting) with a nozzle inclined with respect to a workpiece.

In the case of machining along a curved workpiece surface in three-dimensional laser beam machining, even if machining is performed such that a nozzle center point (tool center point) is at a constant speed, a corner portion or the like has a difference in machining speed between a workpiece upper surface and a workpiece lower surface. For example, assume a case where the N1 to N3 blocks are machined under the same machining condition at the time of machining along a curved surface of a workpiece, as in FIG. 11. Since a travel amount $L_2$ of an extended tool center point (to be described later) at a lower surface of a workpiece 2 at the time of machining of the N2 block in FIG. 11 is smaller than a travel amount $L_1$ of a tool center point at an upper surface of the workpiece 2, the machining speed at the lower surface of the workpiece 2 is lower than that at the upper surface of the workpiece 2. This may cause poor machining at the lower surface of the workpiece 2.

In the case of bevel cutting, since machining is performed with the nozzle 1 inclined with respect to the workpiece 2, a board thickness at a portion to be machined is a board thickness $D_2$ different from a board thickness $D_1$ when the nozzle 1 is perpendicular to the workpiece 2, as shown in FIG. 12. Thus, a machining condition needs to be changed from a machining condition when the nozzle 1 is perpendicular in accordance with an inclination angle of the nozzle 1.

When circular interpolation is performed in bevel cutting, as shown in FIG. 13, a travel amount $L_2$ of an extended tool center point at a lower surface of the workpiece 2 is larger than a travel amount $L_1$ of the tool center point at an upper surface of the workpiece 2, and the machining speed at the lower surface of the workpiece 2 is higher. In this case, a machining path is common to both a case where the nozzle 1 is perpendicular to the workpiece 2 and a case where the nozzle 1 is inclined with respect to the workpiece 2. At the time of program creation, however, a machining condition different from a machining condition when the nozzle 1 is perpendicular to the workpiece 2 needs to be specified in consideration of the tilt of the nozzle 1 with respect to the upper surface of the workpiece 2.

Note that a technique for changing a machining condition in accordance with the speed of a nozzle tip (for example, Japanese Patent Application Laid-Open No. 09-150282 or Japanese Patent Application Laid-Open No. 2000-351087) and a technique for creating a machining program including machining condition data from a machining shape (for example, Japanese Patent Application Laid-Open No. 06-110524 or Japanese Patent Application Laid-Open No. 06-142954) are publicly known as prior art techniques pertaining to change of a machining condition.

In the techniques disclosed in Japanese Patent Application Laid-Open No. 09-150282 and Japanese Patent Application Laid-Open No. 2000-351087 described earlier, however, no regard is given to a shape at a workpiece lower surface. To prevent poor machining in the case of machining shown in FIG. 11, separate machining conditions need to be purposely specified for a linear portion (the N1 or N3 block) and a corner portion (the N2 block) at the time of program creation. For example, when three-dimensional machining is performed such that the nozzle 1 is always perpendicular to the workpiece 2, as in FIG. 11, since the N2 block corresponds to a corner, a machining program which specifies a machining condition different from a machining condition for the N1 and N3 blocks needs to be created.

Even if the technique disclosed in Japanese Patent Application Laid-Open No. 06-110524 or Japanese Patent Application Laid-Open No. 06-142954 is used, an NC program which specifies a detailed machining condition in accordance with a machining shape needs to be created in advance on the basis of information, such as CAD/CAM data, which is troublesome. For example, to perform linear machining with the nozzle 1 perpendicular to the workpiece 2 for the N1 block, linear bevel cutting with the nozzle 1 tilted at an angle θ with respect to the workpiece 2 for the N2 block, and circular bevel cutting with the nozzle 1 tilted at the angle θ with respect to the workpiece 2 for the N3 block, as in FIG. 14, a machining program which specifies different machining conditions for the N1, N2, and N3 blocks needs to be created.

SUMMARY OF THE INVENTION

Under the circumstances, an object of the present invention is to provide a numerical controller having a function of automatically setting an optimum machining condition on the basis of a workpiece thickness and a nozzle posture during operation.

A numerical controller according to the present invention controls a laser beam machine in accordance with a program and performs three-dimensional laser beam machining on a workpiece. A first aspect of the numerical controller includes a machining condition change unit configured to obtain a speed ratio between a machining speed at an upper surface of the workpiece and a machining speed at a lower surface of the workpiece on a basis of a posture of a nozzle of the laser beam machine with respect to the workpiece, the posture being specified by the program, and to change a machining condition specified by the program on a basis of the obtained speed ratio, and the three-dimensional laser beam machining by the laser beam machine is controlled on a basis of the machining condition changed by the machining condition change unit.

A second aspect of the numerical controller according to the present invention includes a machining condition change unit configured to obtain a change ratio between a workpiece board thickness when a nozzle of the laser beam machine is in a posture of the nozzle with respect to the workpiece, the posture being specified by the program, and a workpiece board thickness when the nozzle is perpendicular to an upper surface of the workpiece on a basis of the posture specified by the program and to change a machining condition specified by the program on a basis of the obtained change ratio, and the three-dimensional laser beam machining by the laser beam machine is controlled on a basis of the machining condition changed by the machining condition change unit.

According to the present invention, a machining condition can be automatically set on the basis of a difference in a machining region between a workpiece upper surface and a workpiece lower surface caused by a change in posture in three-dimensional laser beam machining. In bevel cutting as well, a machining condition can be automatically set on the basis of the tilt of a nozzle. This eliminates the need to set a detailed machining condition in accordance with the shape of a workpiece and the posture of a nozzle and reduces the need to specify a machining condition in accordance with a machining shape on the basis of the information of CAD/CAM data. Thus, machining quality can be more easily improved than ever before.

BRIEF DESCRIPTION OF THE DRAWINGS

The above and other objects and features of the present invention will be apparent from the following description of embodiments with reference to the appended drawings, in which.

DETAILED DESCRIPTION OF THE PREFERRED EMBODIMENTS

A numerical controller according to a first embodiment of the present invention will be described with reference to FIGS. 1 to 5.

Figure 1:
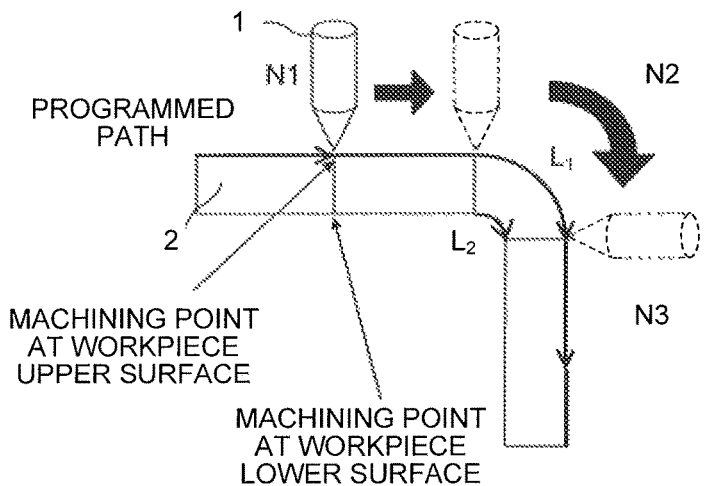
FIG. 1 is a view for explaining a machining situation for a workpiece to be machined by a laser beam machine which is controlled by a numerical controller according to a first embodiment of the present invention.

FIG. 1 is a view for explaining a machining situation for a workpiece to be machined by a laser beam machine which is controlled by the numerical controller according to the first embodiment of the present invention.

When the numerical controller according to the embodiment is to perform three-dimensional laser beam machining such that a nozzle 1 is always perpendicular to a workpiece 2, as shown in FIG. 1, the numerical controller controls a laser beam machine by performing machining condition setting, that is, changing a machining condition, such as peak power, frequency, or a duty ratio, if there is a difference in speed between an upper surface and a lower surface of the workpiece 2. As for machining position at the workpiece 2 based on laser, a machining point at the upper surface of the workpiece 2 coincides with a tool center point, whereas a machining point at the lower surface of the workpiece 2 coincides with a point obtained by extending the tool center point in the nozzle axis direction by a length corresponding to the board thickness of the workpiece 2.

Figure 2:
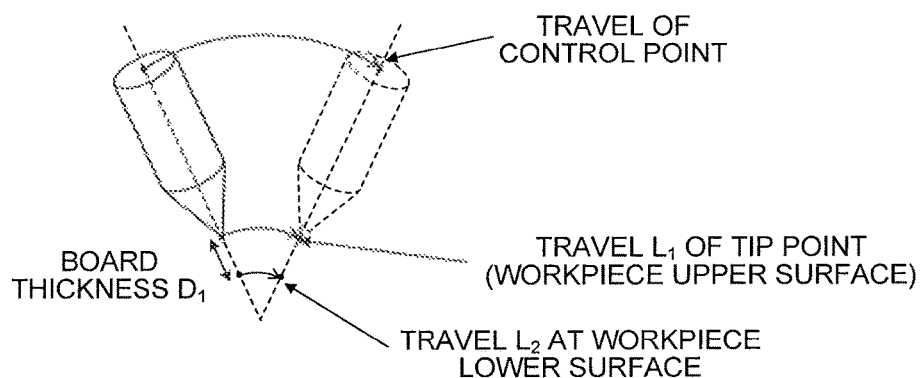
FIG. 2 is a view for explaining a method for obtaining a travel amount $L_2$ of an extended tool center point at a workpiece lower surface from a travel amount $L_1$ at a workpiece upper surface of a tool center point in the machining situation shown in FIG. 1.

In tool center point control that is publicly known by Japanese Patent Application Laid-Open No. 2012-177973 and the like, travel of a control point is generally calculated from travel of a tool center point (a programmed path). In contrast, the numerical controller according to the present embodiment further calculates a travel amount $L_2$ of a point on a workpiece lower surface (an extended tool center point) obtained by extending a tool center point by a length corresponding to a board thickness $D_1$ in a nozzle axis direction as viewed from a control point, as shown in FIG. 2.

Consider a case where the laser beam machine is a tool head rotation type multi-axis working machine in which a tool head moves linearly along the X-, Y-, and Z-axes and rotates about the C- and B-axes, as an example for calculating the travel amount $L_2$ of the extended tool center point. As publicly known in Japanese Patent Application Laid-Open No. 2013-196327 and the like, a travel amount $L_1(t_i)$ of the tool center point on the upper surface of the workpiece 2 from a computation time $t_{i-1}$ in a computation cycle previous to a current computation cycle to a computation time $t_i$ in the current computation cycle is computed by equation (1) below. Note that, in equation (1), $Tp_1(t_i)$ represents a tool center point position $Tp_1$ at the computation time $t_i$, and $Tp_1(t_{i-1})$ represents the tool center point position $Tp_1$ at the computation time $t_{i-1}$.

$$L_1(t_i)=|Tp_1(t_i)-Tp_1(t_{i-1})| \tag{1}$$

Similarly, a position (an extended tool center point position) $Tp_2(Xt_2, Yt_2, Zt_2)$, obtained by extending the tool center point position $Tp_1$ by a length corresponding to the workpiece board thickness $D_1$ in the axial direction of the nozzle 1, is computed using equations (2) and (3) below. In equations (2) and (3), Po(Pox, Poy, Poz) represents a position on a machine coordinate system of the origin of a coordinate system (a table coordinate system) which is fixed on a table where a workpiece is placed. V1 represents a tool length (a tool length+the workpiece board thickness $D_1$) correction vector on the table coordinate system, which extends from the extended tool center point position $Tp_2$ to a linear three-axis position $Pl$, and is a vector obtained by rotating, by $Bm$ and $Cm$, a reference tool length correction vector $Vs$ when $Bm=Cm=0$. $Rt$ represents a rotation matrix from the machine coordinate system to the table coordinate system. $Rc$ and $Rb$ represent rotation matrices based on an interpolated rotary two-axis position $Pr(Bm,Cm)$.

$$Tp_2 = Rt*(Pl-Po) - Vl \quad (2)$$

$$Rt = \begin{bmatrix} 1 & 0 & 0 \\ 0 & 1 & 0 \\ 0 & 0 & 1 \end{bmatrix}$$

$$Rc = \begin{bmatrix} \cos(Cm) & -\sin(Cm) & 0 \\ \sin(Cm) & \cos(Cm) & 0 \\ 0 & 0 & 1 \end{bmatrix}$$

$$Rb = \begin{bmatrix} \cos(Bm) & 0 & \sin(Bm) \\ 0 & 1 & 0 \\ -\sin(Bm) & 0 & \cos(Bm) \end{bmatrix}$$

$$Vl = Rc*Rb*Vs \quad (3)$$

A travel amount $L_2(t_i)$ of the extended tool center point on the lower surface of the workpiece 2 from the computation time $t_{i-1}$ in the computation cycle previous to the current computation cycle to the computation time $t_i$ in the current computation cycle is computed by equation (4) below. Note that, in equation (4), $Tp_2(t_i)$ represents the extended tool center point position $Tp_2$ at the computation time $t_i$, and $Tp_2(t_{i-1})$ represents the extended tool center point position $Tp_2$ at the computation time $t_{i-1}$.

$$L_2(t_i) = |Tp_2(t_i) - Tp_2(t_{i-1})| \quad (4)$$

A tool center point travel speed ratio $(L_2/L_1)$ $(=L_2(t_i)/L_1(t_i))$ can be computed from the travel amount $L_1(t_i)$ of the tool center point on the upper surface of the workpiece 2 obtained by equation (1) and the travel amount $L_2(t_i)$ of the extended tool center point on the lower surface of the workpiece 2 obtained by equation (4).

If the speed ratio $(L_2/L_1)$ thus computed is not 1.0 or falls outside a range defined in advance, the numerical controller according to the present embodiment determines an optimum machining condition from the tool center point speed ratio $(L_2/L_1)$ of the workpiece lower surface to the workpiece upper surface by the methods shown below, changes a machining condition to be used for machining to the determined machining condition, and performs machining under the optimum machining condition.

Method 1: A table where a machining condition is associated with each speed ratio $(L_2/L_1)$ is prepared in advance, and an optimum machining condition for a speed ratio $(L_2/L_1)$ is selected using the table. The correspondence between a speed ratio and a machining condition is obtained in advance by experiment or the like, and the created table is stored in advance in a memory of a numerical controller 10.

Figure 3:
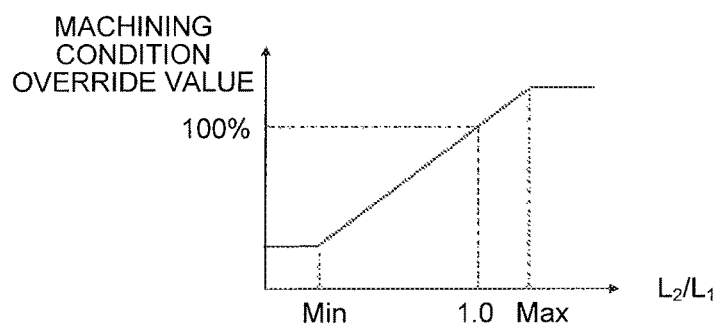
FIG. 3 is a chart for explaining obtaining an override value from a tool center point speed ratio ($L_2/L_1$) of the workpiece lower surface to the workpiece upper surface in the machining situation shown in FIG. 1 and multiplying a machining condition by the obtained override value.

Method 2: A relational expression indicating the relationship between a speed ratio $(L_2/L_1)$ and an override value as shown in FIG. 3 is created in advance on the basis of an experiment or the like, an override value is obtained from a speed ratio $(L_2/L_1)$ using the relational expression, and a machining condition is multiplied by the obtained override value (note that an upper limit and a lower limit are put on an override value, by which a machining condition is to be multiplied, as shown in FIG. 3).

Figure 4:
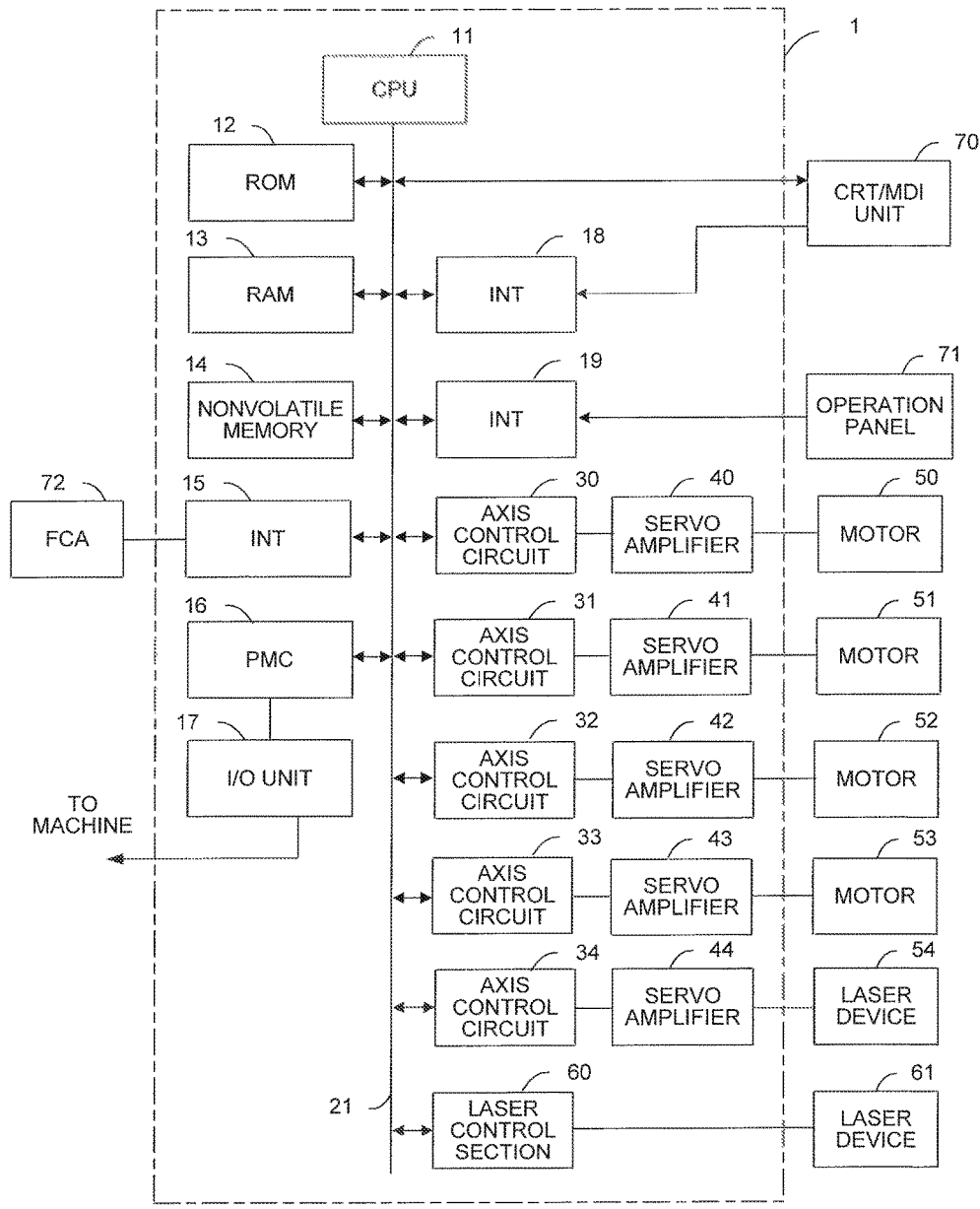
FIG. 4 is a block diagram of a main portion of the numerical controller according to the first embodiment of the present invention.

FIG. 4 is a block diagram of a main portion of the numerical controller according to the present embodiment.

The numerical controller 10 includes a CPU 11 which integrally controls the whole. The CPU 11 reads out a system program stored in a ROM 12 via a bus 20 and executes control of the whole numerical controller 10 in accordance with the system program. Computational data, display data, and the like are temporarily stored in a RAM 13 which is composed of a DRAM or the like.

A machining program and various parameters are stored in a nonvolatile memory 14 which is composed of a CMOS, an SRAM, or the like backed up with a battery (not shown). An interface 15 is provided for input/output to/from an external instrument, and an external instrument 72, such as an off-line programming device or a printer, is connected to the interface 15. If a machining program is created by an off-line programming device, the data of the machining program is read into the numerical controller 10 via the interface 15. The data of a machining program edited by the numerical controller 10 can be output by, for example, a printer.

A programmable machine controller (PMC) 16 is incorporated in the numerical controller 10 and controls a machine with a sequence program created in ladder format. That is, the PMC 16 converts M functions, the S function, and the T function specified in a machining program into signals needed in a sequence program and outputs the signals from an I/O unit 17 to a machine side (the laser beam machine in the present embodiment). The output signals actuate various operation sections (for example, an air cylinder, a screw, and an electric actuator) on the machine side. The PMC 16 receives a signal from various switches on the machine side, switches of a machine operation panel, and the like, performs necessary processing on the signal, and passes the signal to the CPU 11.

A display controller (not shown) converts pieces of digital data, such as current positions of respective axes of the machine, an alarm, a parameter, and image data, into image signals and outputs the image signals. The image signals are sent to a CRT/MDI unit 70 and are displayed. An interface 18 receives data from a keyboard in the CRT/MDI unit 70 and passes the data to the CPU 11.

An interface 19 is connected to an operation panel 71. The interface 19 can be used to receive a pulse from a manual pulse generator mounted on the operation panel 71 and manually move and position a movable portion of a machine main body including a nozzle head which the laser beam machine includes.

Axis control circuits 30 to 34 receive move commands for respective axes from the CPU 11 and output the move commands to servo amplifiers 40 to 44. The servo amplifiers 40 to 44 drive motors 50 to 54 for the respective axes in accordance with the move commands. The motors 50 to 54 for the respective axes drive the laser beam machine for the respective axes. Each motor is provided with a position detector (not shown), and an output pulse from the position detector is used to generate a position feedback signal or a speed feedback signal.

A laser control section 60 controls an output from a laser device 61 in accordance with a command from the CPU 11.

Figure 5:
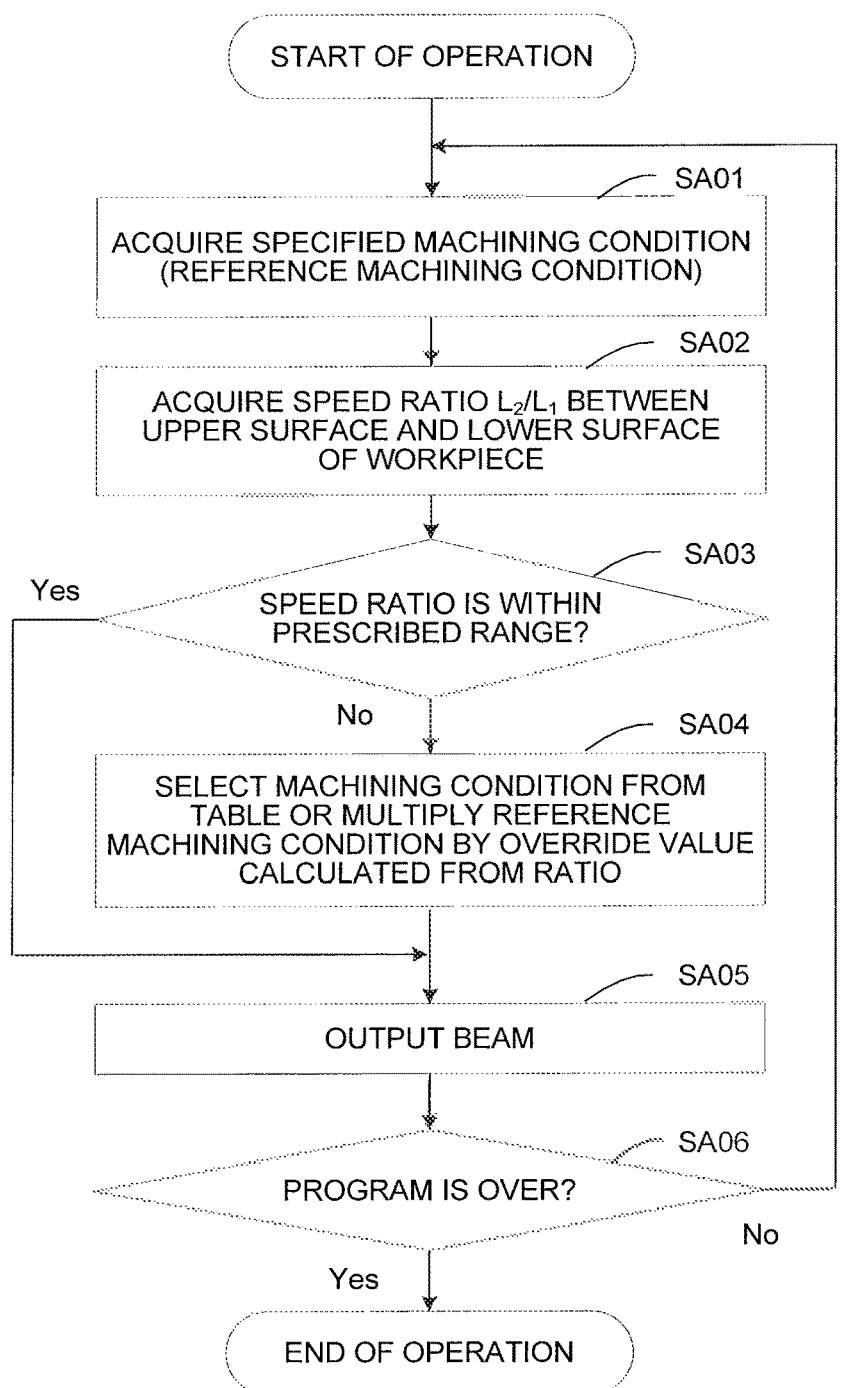
FIG. 5 is a flowchart showing the flow of a machining condition change process to be executed by the numerical controller in FIG. 1.

FIG. 5 is a flowchart of a process of determining a machining condition to be executed on the numerical controller 10. The process is explained below according to respective steps.

[Step SA01] When operation is started, a block of a program read out from the nonvolatile memory 14 or the like is analyzed, and a machining condition specified by the analyzed block is acquired. A machining condition to be acquired here is a reference machining condition in machining.

[Step SA02] A travel amount $L_1$ of the tool center point on an upper surface of the workpiece 2 and a change in the posture of the nozzle between before and after machining are obtained on the basis of a move command in the program, a travel amount $L_2$ of an extended tool center point at a lower surface of the workpiece 2 is obtained on the basis of the parameters of the travel amount $L_1$ and the change in the posture of the nozzle, and a speed ratio $L_2/L_1$ is calculated on the basis of values of the travel amounts $L_1$ and $L_2$.

[Step SA03] It is determined whether or not the speed ratio $L_2/L_1$ calculated in step SA02 falls within a predetermined range defined in advance. If the speed ratio $L_2/L_1$ falls within the predetermined range, the flow proceeds to step SA05. On the other hand, if the speed ratio $L_2/L_1$ falls outside the predetermined range, the flow proceeds to step SA04.

[Step SA04] A machining condition is changed by selecting an optimum machining condition for the speed ratio $L_2/L_1$ from a table or multiplying the reference machining condition by an override value calculated from the speed ratio $L_2/L_1$.

[Step SA05] Three-dimensional laser beam machining is performed by outputting a beam under the machining condition specified by the program (for a case where the speed ratio $L_2/L_1$ falls within the predetermined range) or under the machining condition selected or changed in step SA04.

[Step SA06] It is determined whether or not the program is over. If the program is over, machining operation is ended. On the other hand, if the program is not over, the flow returns to step SA01.

A numerical controller according to a second embodiment of the present invention will be described with reference to FIGS. 6 to 10.

Figure 6:
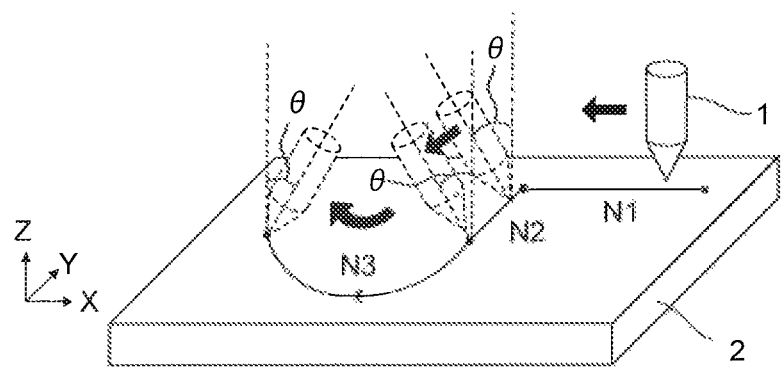
FIG. 6 is a view for explaining a machining situation for a workpiece to be machined by a laser beam machine which is controlled by a numerical controller according to a second embodiment of the present invention.

The numerical controller according to this embodiment sets a machining condition for a case as shown in FIG. 6 where bevel cutting is performed with a nozzle tilted at an angle θ with respect to a workpiece, in three-dimensional laser beam machining.

Figure 7:
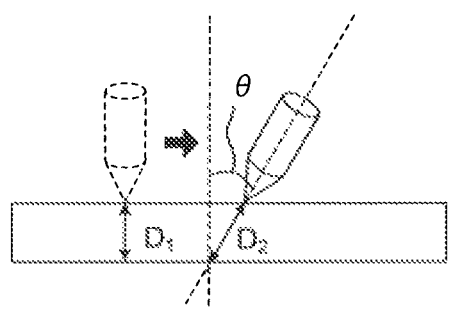
FIG. 7 is a view for explaining a method for obtaining a workpiece board thickness $D_2$ from a workpiece board thickness $D_1$ in the machining situation shown in FIG. 6.

When bevel cutting that linearly moves the nozzle tilted at the angle θ with respect to the workpiece, as indicated by the N2 block in FIG. 6, is to be performed in three-dimensional laser beam machining, the numerical controller according to the present embodiment obtains a board thickness $D_2$ ($D_2=D_1/\cos θ$) when the nozzle is tilted at the angle θ to be contrasted with a board thickness $D_1$ when the nozzle is perpendicular, as shown in FIG. 7, and obtains a board thickness change ratio ($D_2/D_1$) from the obtained board thickness $D_2$. If the change ratio ($D_2/D_1$) is not 1.0 or falls outside a prescribed range, the numerical controller determines an optimum machining condition from the change ratio ($D_2/D_1$) using equation (5) below and performs machining under the determined optimum machining condition.

$$\text{Machining condition override value}=K\times(D_2/D_1) \quad (5)$$

Figure 8:
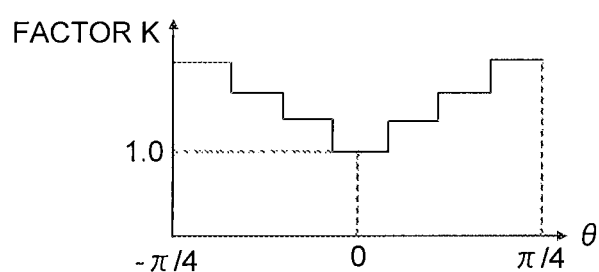
FIG. 8 is a chart for explaining obtaining a factor K from a tilt angle θ of a nozzle and multiplying the obtained factor K by a workpiece board thickness change ratio $D_2/D_1$ to obtain a machining condition override value in the machining situation shown in FIG. 6.

Note that, in equation (5) above, an appropriate value corresponding to a range of the angle θ is obtained in advance for the factor K by experiment or the like and is set in advance as a value corresponding to the range of the angle θ, as shown in, for example, FIG. 8. As described above, an optimum machining condition is determined through multiplication by a machining condition override value in accordance with the inclination of the nozzle.

Figure 9:
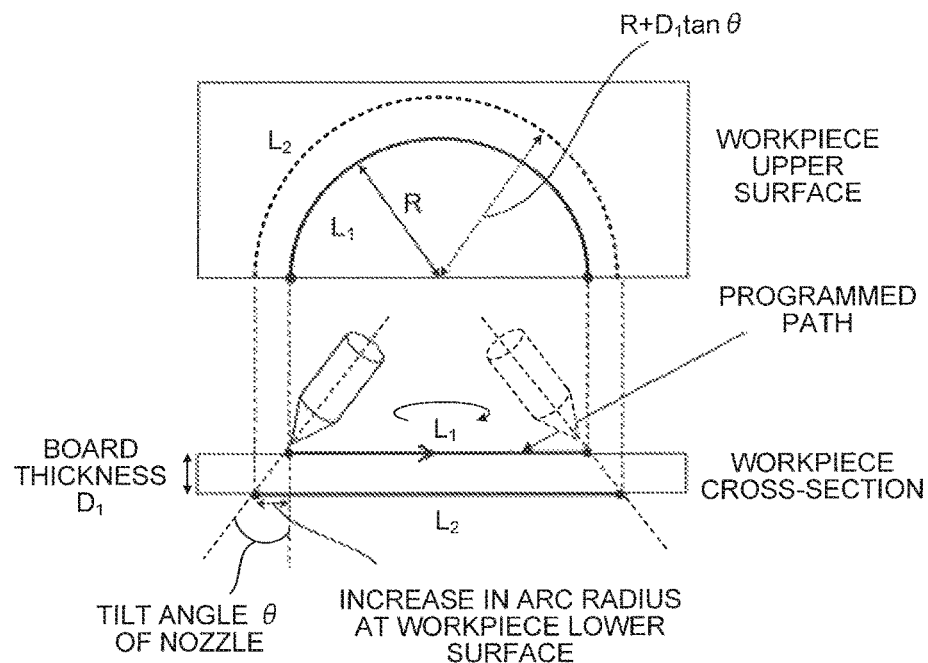
FIG. 9 is a view for explaining obtaining a tool center point speed ratio between a workpiece upper surface and a workpiece lower surface from a tilt angle θ of a nozzle and performing machining using the obtained speed ratio in the machining situation shown in FIG. 6.
Figure 11:
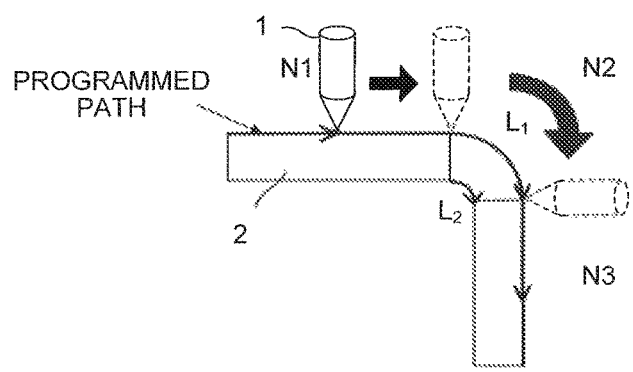
FIG. 11 is a view for explaining problem (1) caused by a workpiece machining situation in a prior art technique.
Figure 12:
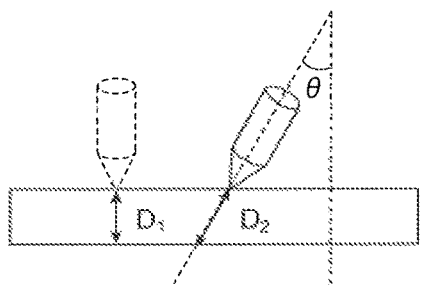
FIG. 12 is a view for explaining problem (2) caused by a workpiece machining situation in a prior art technique.
Figure 13:
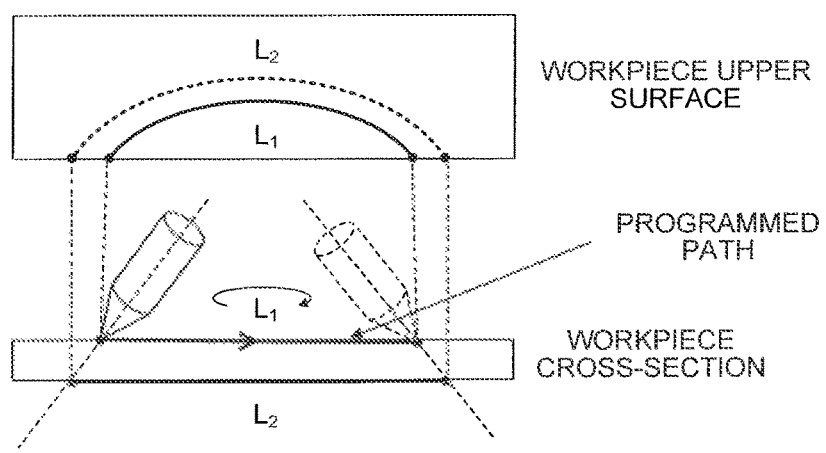
FIG. 13 is a view for explaining problem (3) caused by a workpiece machining situation in a prior art technique.
Figure 14:
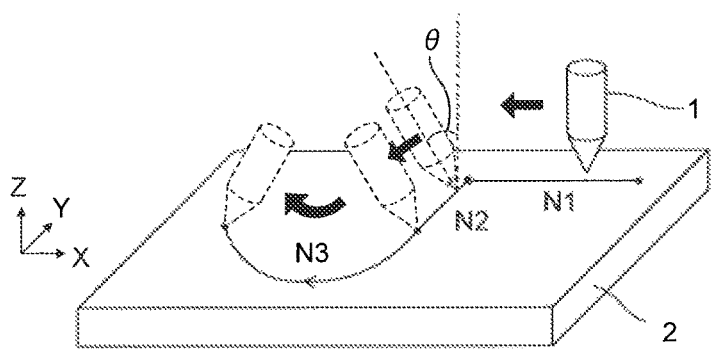
FIG. 14 is a view for explaining problem (4) caused by a workpiece machining situation in a prior art technique.

When circular bevel cutting is to be performed with the nozzle tilted at the angle θ with respect to the workpiece, as indicated by the N3 block in FIG. 6, in three-dimensional laser beam machining, since the nozzle is tilted as shown in FIG. 9, and an arc radius at a workpiece lower surface is $R+D_1 \tan θ$. In this case, there is a difference in speed (a difference in travel amount within a fixed time) between a workpiece upper surface and the workpiece lower surface. The numerical controller according to the present embodiment selects a determined or changed a machining condition on the basis of a difference in tool center point speeds between the workpiece upper surface and the workpiece lower surface by the same method as in the first embodiment and applies equation (5) for board thickness to the selected machining condition to determine an optimum machining condition based on the board thickness change ratio ($D_2/D_1$).

The numerical controller according to the present embodiment is the same in basic configuration as that according to the first embodiment.

Figure 10:
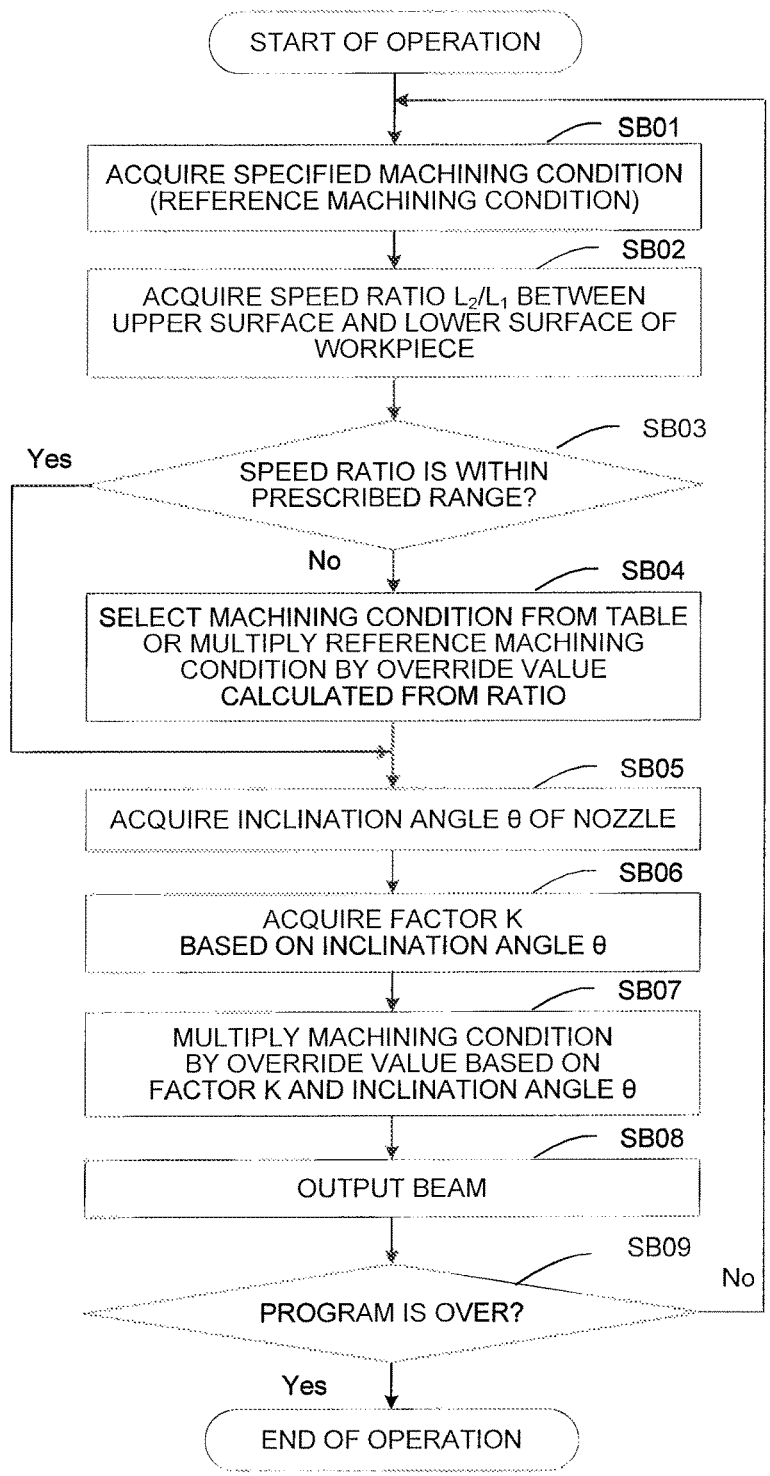
FIG. 10 is a flowchart showing the flow of a machining condition change process to be executed by the numerical controller according to the second embodiment of the present invention.

FIG. 10 is a flowchart of a process of determining a machining condition to be executed on a numerical controller 10 according to the present embodiment.

[Step SB01] When operation is started, a block of a program read out from a nonvolatile memory 14 or the like is analyzed, and a machining condition specified by the analyzed block is acquired. A machining condition to be acquired here is a reference machining condition in machining.

[Step SB02] A travel amount $L_1$ of a tool center point on a workpiece upper surface and a change in the posture of the nozzle between before and after machining are obtained on the basis of a move command in the program, a travel amount $L_2$ of an extended tool center point at a workpiece lower surface is obtained on the basis of the parameters of the travel amount $L_1$ and the change in the posture of the nozzle, and a speed ratio $L_2/L_1$ is calculated on the basis of values of the travel amounts $L_1$ and $L_2$.

[Step SB03] It is determined whether or not the speed ratio $L_2/L_1$ calculated in step SB02 falls within a predetermined range defined in advance. If the speed ratio $L_2/L_1$ falls within the predetermined range, the flow proceeds to step SB05. On the other hand, if the speed ratio $L_2/L_1$ falls outside the predetermined range, the flow proceeds to step SB04.

[Step SB04] A machining condition is changed by selecting an optimum machining condition for the speed ratio $L_2/L_1$ from a table or multiplying the reference machining condition by an override value calculated from the speed ratio $L_2/L_1$.

[Step SB05] An inclination angle θ of the nozzle is acquired from a result of analysis of the move command in the program.

[Step SB06] A factor K is obtained on the basis of the inclination angle θ of the nozzle acquired in step SB05 using a conversion equation set in advance.

[Step SB07] An override value by which the machining condition is to be multiplied is obtained on the basis of the factor K obtained in step SB06 and the inclination angle θ using equation (5), and the machining condition is multiplied by the obtained override value.

[Step SB08] Three-dimensional laser beam machining is performed by outputting a beam under the machining condition determined in step SB07.

[Step SB09] It is determined whether or not the program is over. If the program is over, machining operation is ended. On the other hand, if the program is not over, the flow returns to step SB01.

The embodiments of the present invention have been described above. The present invention, however, is not limited to the above-described embodiments and can be worked out in various aspects by making appropriate changes.

The invention claimed is:

1. A numerical controller for controlling a laser beam machine in accordance with a program and performing three-dimensional laser beam machining on a workplace, the numerical controller comprising:
   a machining condition change unit configured to:
      obtain a speed ratio between a machining speed at an upper surface of the workpiece determined based on a upper travel amount of the laser beam on the upper surface of the workpiece and a machining speed at a lower surface of the workpiece determined based on a lower travel amount of the laser beam on the lower surface of the workpiece,
      wherein the upper travel amount and lower travel amount are determined on a basis of a posture of a nozzle of the laser beam machine with respect to the workplace, the posture being specified by the program, and
      change a machining condition specified by the program on basis of the obtained speed ratio,
   wherein the three-dimensional laser beam machining by the laser beam machine is controlled on a basis of the machine condition changed by the machining condition change unit.

2. A numerical controller for controlling a laser beam machine in accordance with a program and performing three-dimensional laser beam machining on a workplace, the numerical controller comprising:
   a machining condition change unit configured to:
      obtain a change ratio between a workpiece board thickness from an upper surface of the workplace to a lower surface of the workpiece when a nozzle, of the laser beam machine is in a non-perpendicular posture of the nozzle with respect to the upper surface of the workplace, the posture being specified by the program, and a workplace board thickness from the upper surface of the workpiece to the lower surface of the workpiece when the nozzle is perpendicular to an upper surface of the workplace on a basis of the posture specified by the program, and
      change a machining condition specified by the program on a basis of the obtained change ratio,
   wherein the three-dimensional laser beam machining by the laser beam machine controlled on a basis of the machine condition changed by the machining condition change unit.

* * * * *